United States Patent [19]
Caughman, Jr. et al.

[11] Patent Number: 6,146,528
[45] Date of Patent: Nov. 14, 2000

[54] SLUDGE FILTRATION SYSTEM INCLUDING SELECTIVELY SLIDABLY REMOVABLE FILTER ASSEMBLIES AND METHOD

[76] Inventors: Carl Russell Caughman, Jr., 7419 Pierrepont Dr., Houston, Tex. 77040; Paul Kesterton, 807 S. Post Oak La., #272, Houston, Tex. 77056

[21] Appl. No.: 09/265,055

[22] Filed: Mar. 9, 1999

[51] Int. Cl.⁷ .................................................. B01D 29/05
[52] U.S. Cl. .......................... 210/236; 210/241; 210/406; 210/484
[58] Field of Search .................................... 210/153, 236, 210/346, 359, 241, 473, 406, 455, 484, 499, 513, 486

[56] References Cited

U.S. PATENT DOCUMENTS

| | | | |
|---|---|---|---|
| 1,311,639 | 7/1919 | Cartwright | 210/153 |
| 1,331,900 | 2/1920 | Cartwright . | |
| 2,649,965 | 8/1953 | King et al. | 210/149 |
| 3,430,767 | 3/1969 | Lawalin et al. . | |
| 4,059,525 | 11/1977 | Krasnow | 210/236 |
| 4,136,034 | 1/1979 | Grosshandler | 210/346 |
| 4,159,953 | 7/1979 | Paquette | 210/396 |
| 4,458,059 | 7/1984 | Fields | 210/266 |
| 4,539,114 | 9/1985 | Mention et al. | 210/330 |
| 4,682,993 | 7/1987 | Todd et al. | 55/314 |
| 4,929,353 | 5/1990 | Harris | 210/237 |
| 5,123,944 | 6/1992 | Cooper | 55/378 |
| 5,200,064 | 4/1993 | Russ et al. | 210/94 |
| 5,234,309 | 8/1993 | Foster | 414/525.9 |
| 5,242,588 | 9/1993 | Reese | 210/232 |
| 5,589,081 | 12/1996 | Harris | 210/804 |
| 5,591,331 | 1/1997 | Nurse, Jr. | 210/232 |
| 5,595,654 | 1/1997 | Caughman, Jr. | 210/323.1 |
| 5,670,039 | 9/1997 | Harris | 210/138 |
| 5,679,258 | 10/1997 | Petersen | 210/703 |
| 5,681,460 | 10/1997 | Caughman, Jr. | 210/232 |
| 5,707,535 | 1/1998 | Harris | 210/804 |
| 5,759,393 | 6/1998 | Nurse, Jr. | 210/232 |
| 5,797,975 | 8/1998 | Davis | 55/493 |

*Primary Examiner*—David A. Simmons
*Assistant Examiner*—Frank M. Lawrence
*Attorney, Agent, or Firm*—Keeling Law Firm

[57] ABSTRACT

A sludge filtration system generally including a container, a first filter assembly defining a first filtrate cavity, a first device for evacuating sludge filtrate from the first filtrate cavity, and a device for selectively slidably removing the first filter assembly from the container. The container can be either an open-top box or a vacuum box and is constructed to receive sludge therein. In the preferred embodiment, the system further includes a second filter assembly defining a second filtrate cavity, with the second filter assembly attached to the first filter assembly and preferably extending from the first filter assembly in a direction distal to the bottom of the container. Also preferably, the system includes a device for stabilizing the filter assemblies when they are slidably removed from the container. The preferred embodiment of the device for stabilizing includes a plurality of extendible wheeled legs that are removably attached to the first filter assembly as it is being removed from the container.

29 Claims, 7 Drawing Sheets

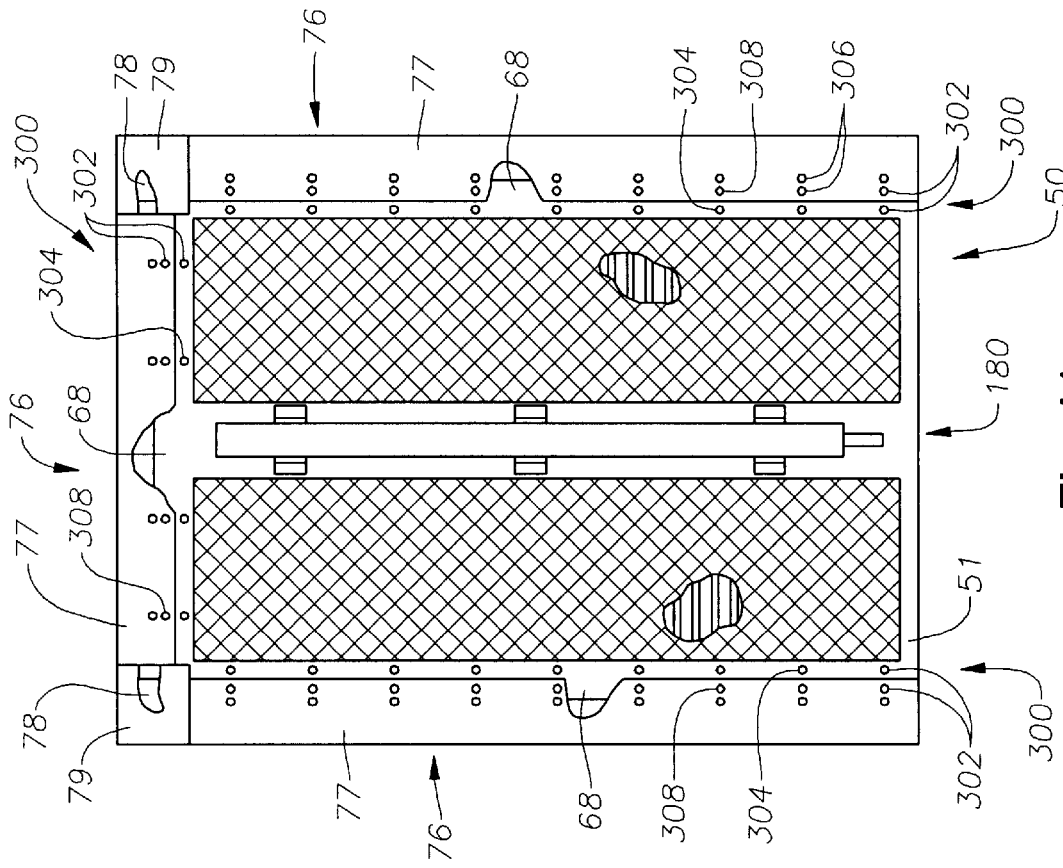
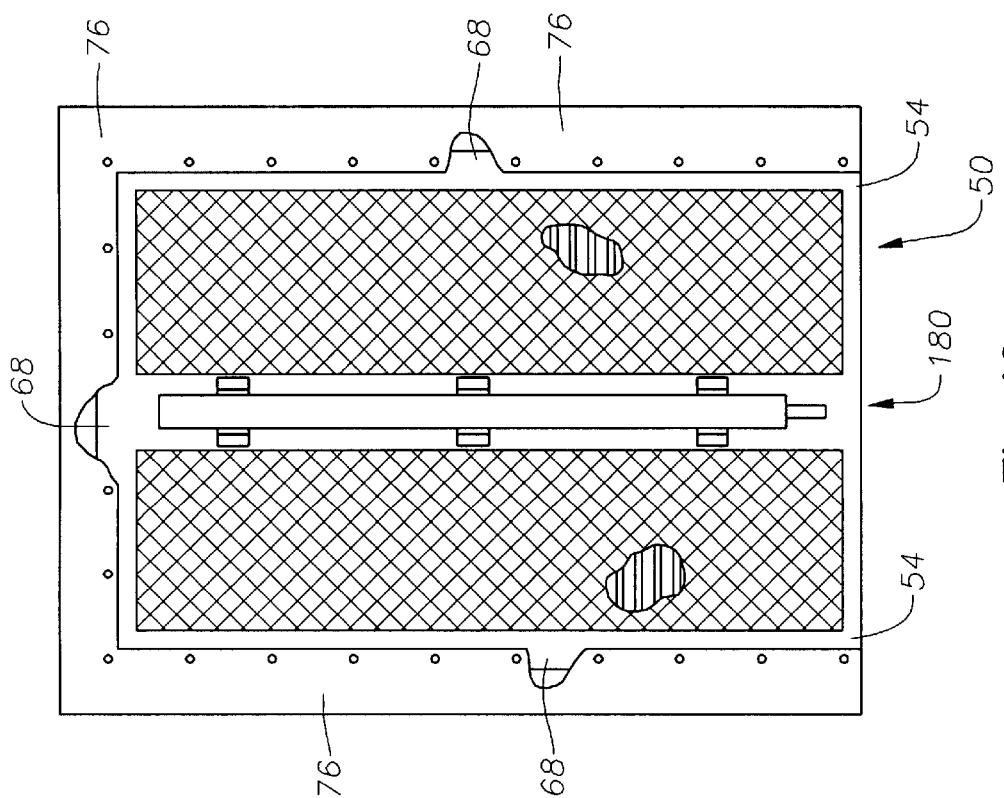

SLUDGE FILTRATION SYSTEM INCLUDING SELECTIVELY SLIDABLY REMOVABLE FILTER ASSEMBLIES AND METHOD

BACKGROUND OF THE INVENTION

1. Field of the Invention

This invention relates generally to sludge filtration systems for separating sludge solids from sludge liquids. More specifically, this invention relates to such systems which include at least one filter assembly through which vacuum filtration can be induced and whose filter assemblies are selectively slidably removable from their associated containers.

The removability of the filter assemblies from their associated containers enables the thorough and efficient cleaning of the system. In turn, the thorough and efficient cleaning of the system is critical for the continued proper operation of the system and for safety purposes. If the system, particularly the filtration elements of the system, are not cleaned, then solid matter may build up or become lodged thereon restricting the flow of filtrate through the filtration elements. In addition, some of the sludge introduced into the system may be hazardous to the health of operators. Thus, after use, such systems must be properly cleaned so that all hazardous sludge residue is adequately removed from the system, allowing the system to be safely used again.

2. Related Art

Sludge filtration systems are known to the prior art. Illustrative of such systems are this Applicant's own U.S. Pat. Nos. 5,595,654, 5,681,460, and 5,858,226. Also illustrative of such systems are U.S. Pat. Nos. 4,929,353, 5,589,081, and 5,707,535, each issued to Harris. None of the listed patents, however, includes mechanisms and/or methods which enable the efficient and easy removability of the filtration elements from the associated containers.

The majority of prior art systems do not include filtration elements that are easily removable from the container in which they are held. The cleaning of these systems must thus be performed with the filtration elements attached to the container. It has been found, however, that the inclusion of the filtration elements during the cleaning operation inhibits the adequate cleaning of all the elements of the system. This is particularly true for closed-in containers, or vacuum boxes, which include interiors that are not easily accessible to a person. Thus, it would be beneficial to the prior art to provide a sludge filtration system which includes filtration elements that are easily removable from their associated containers. In addition, it would be particularly beneficial to the prior art to provide a sludge filtration system that includes a vacuum box with filtration elements that are easily removable from the vacuum box.

Some of the sludge filtration systems in the prior art include filtration elements that may conceivably be removed from their containers. However, none of these systems include mechanisms or methods which enable and/or aid in the easy and efficient removability of the filtration elements from the containers. For instance, this Applicant's U.S. Pat. No. 5,681,460 teaches a Selectively Removable Sludge Filtration System and Method which in essence comprises a filter basket structure disposed within a container. In order to remove the System from the container, the System is either lifted out of the container (by use of a crane or the like) or the System is slid out of the container. Sliding the disclosed System out of the container may damage either the underside of the System or the container bottom. Likewise, Harris' U.S. Pat. Nos. 4,929,353 and 5,589,081 disclose basket-like filter structures that can be removed from their containers by either lifting or sliding them out of the disclosed container. Lifting the structures would require the use of a crane, a piece of equipment that is not owned by many users of sludge filtration systems. Sliding the structures out of their containers may damage either the underside of the structures or the container bottoms.

Furthermore, in any of the basket-like filtration elements of the prior art and since the disclosed containers stand a given distance from the ground, the sliding removal of the filtration elements eventually results in the filtration elements slamming to the ground, unless the filtration elements are somehow propped up prior to their complete removal from the container. It would thus be beneficial to the prior art to provide a sludge filtration system that includes mechanisms or methods which enable and/or aid in the easy and efficient removability of the filtration elements from the containers.

Moreover, as is known to those skilled in the art, two types of filtration exist: gravitational filtration and vacuum filtration. In gravitational filtration, the filtrate passes through the filtration element simply by the force of gravity. On the other hand, in vacuum filtration, the filtrate passes through the filtration element because a pressure differential has been created, usually by a suction pump, across the filtration element. Each type of filtration has its benefits and drawbacks. Thus, it would be beneficial to the prior art to provide a sludge filtration system that may be used to induce both vacuum filtration and gravitational filtration and that includes filtration elements that are easily removable from their associated containers.

SUMMARY OF THE INVENTION

Accordingly, the objectives of this invention are to provide, inter alia, a sludge filtration system that:
- includes filtration elements that are easily removable from their associated containers;
- includes a vacuum box with filtration elements that are easily removable from the vacuum box;
- includes mechanisms or methods which enable and/or aid in the easy and efficient removability of the filtration elements from their associated containers; and
- may be used to induce both vacuum filtration and gravitational filtration and that includes filtration elements that are easily removable.

Other objectives will become apparent from time to time throughout the specification and claims as hereinafter related.

To fulfill such objectives, my invention is a sludge filtration system generally comprising a container, a first filter assembly defining a first filtrate cavity, a first means for evacuating sludge filtrate from the first filtrate cavity, and a means for selectively slidably removing the first filter assembly from the container. The container can be either an open-top box or a vacuum box and is constructed to receive sludge therein. In the preferred embodiment, the system further comprises a second filter assembly defining a second filtrate cavity, with the second filter assembly attached to the first filter assembly and preferably extending from the first filter assembly in a direction distal to the bottom of the container. Also preferably, the system includes a means for stabilizing the filter assemblies when they are slidably removed from the container. The preferred embodiment of the means for stabilizing comprises a plurality of extendible wheeled legs that are removably attached to the first filter assembly as it is being removed from the container.

BRIEF DESCRIPTION OF THE DRAWINGS

FIG. 9 is a partial cross-sectional view of the hinged first and second filter assemblies.

FIG. 10 is a top view of the system, including a first embodiment of the extension.

FIG. 11 is a top view of the system, including a second embodiment of the extension.

DESCRIPTION OF THE INVENTION

The Sludge Filtration System is generally shown in FIGS. 1–16 as 10. System 10 preferably comprises a container 20, a first filter assembly 50, a first means for evacuating 70 filtrate from first filter assembly 50, and a means for selectively slidably removing 100 first filter assembly 50 from container 20. In general, sludge is introduced into container 20, filtrate filters trough first filter assembly 50, and first means for evacuating 70 evacuates the filtrate from container 20. When no sludge is contained within container 20, first filter assembly 50 may be removed by sliding it out of container 20 by use of the means for selectively slidably removing 100.

Generally, the term sludge includes, inter alia, any solid-liquid sludge and slurry such as sewage and industrial waste. As indicated, sludge contains sludge solids and sludge liquids. In treating the sludge, it is desirable to separate the sludge liquids from the sludge solids for recovery or disposal of the individual components. System 10 provides for and facilitates the desired component separation.

Figure 1:
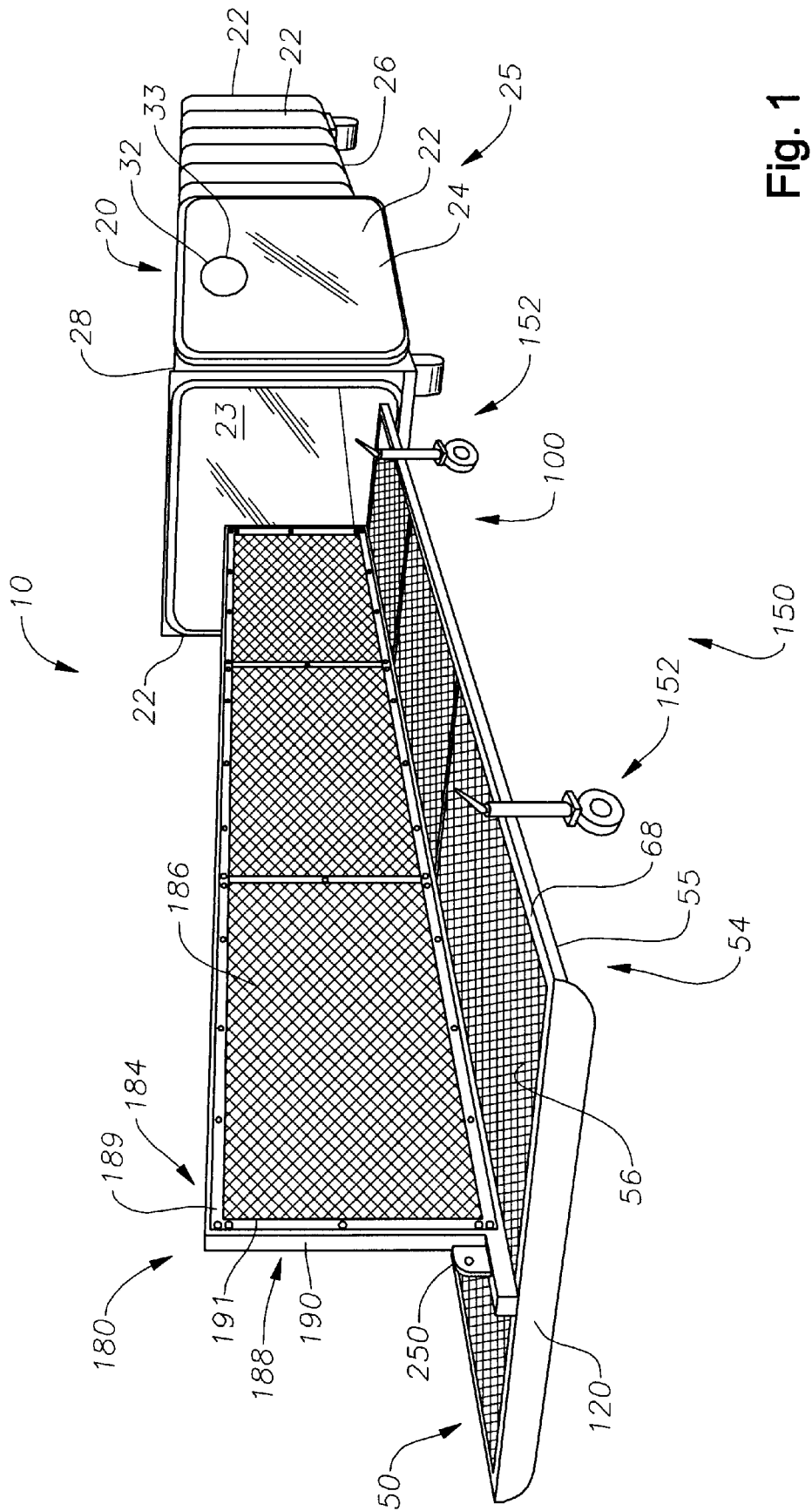
FIG. 1 is an isometric view of the system, with first and second filter assemblies removed from a vacuum container.

Container 20 is constructed to receive sludge therein. Container 20 includes a plurality of container side walls 22 and a container bottom 26. Container 20 may comprise either an open-top box (as in FIG. 2) or a vacuum box (as in FIG. 1), both of which are common in the industry. In the embodiment including the vacuum box as shown in FIG. 1, container 20 also includes a container top 28. In either embodiment, the different parts of container 20 define a container cavity 23 therein.

Figure 2:
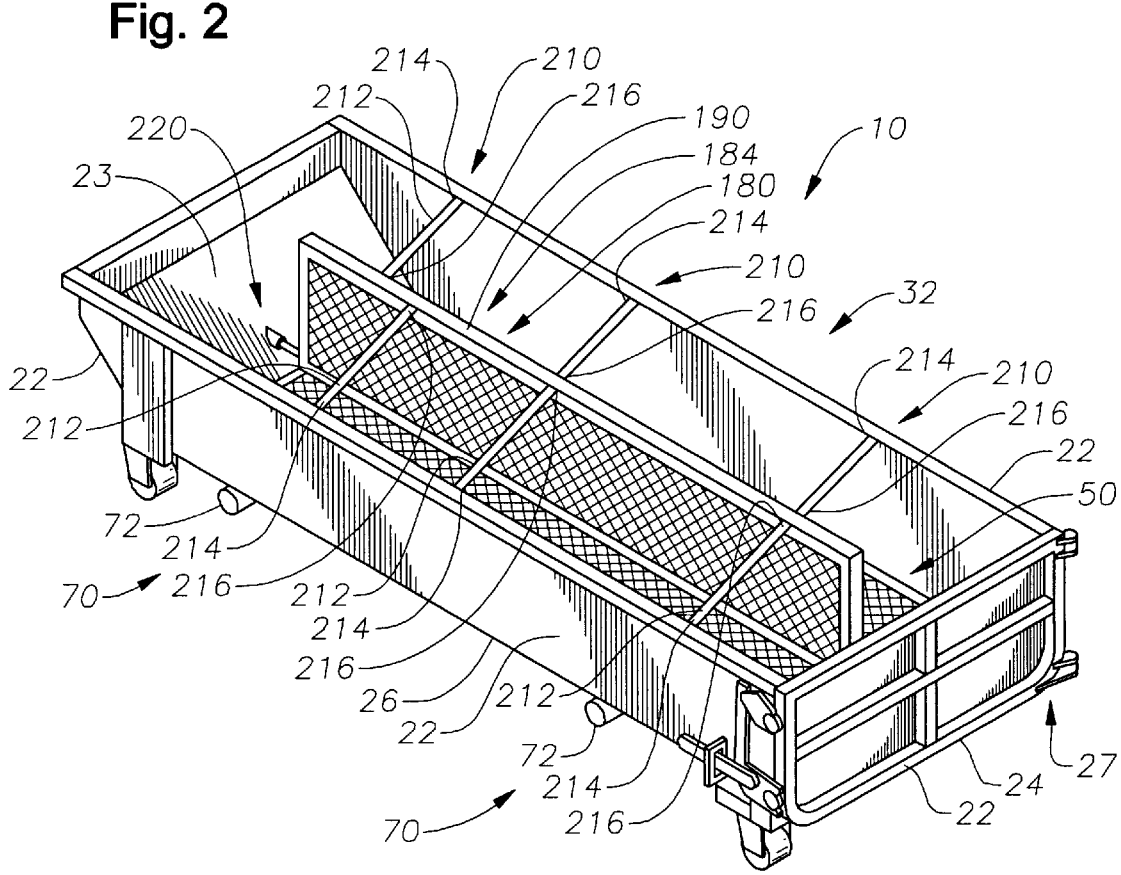
FIG. 2 is an isometric view of the system, with first and second filter assemblies positioned in a regular open-top container.

One of the container side walls 22 comprises a container gate side wall 24, which can be opened thereby defining an open position 25 (see FIG. 1) and a closed position 27 (see FIG. 2). Gate side wall 24 is attached to the remainder of container 20 by means well-known in the art, such as hinges. Preferably, container gate side wall 24 creates a sealing attachment with the remainder of container 20 when container gate side wall 24 is in the closed position 27.

Container 20 further includes at least one container inlet 32. As shown in FIG. 2, in the embodiment of container 20 not including a container top 28, the open container top comprises the container inlet 32. As shown in FIG. 1, in the embodiment of container 20 including a container top 28, one of the container side walls 22 or the container top 28 includes an opening 33, which comprises the container inlet 32.

Figure 3:
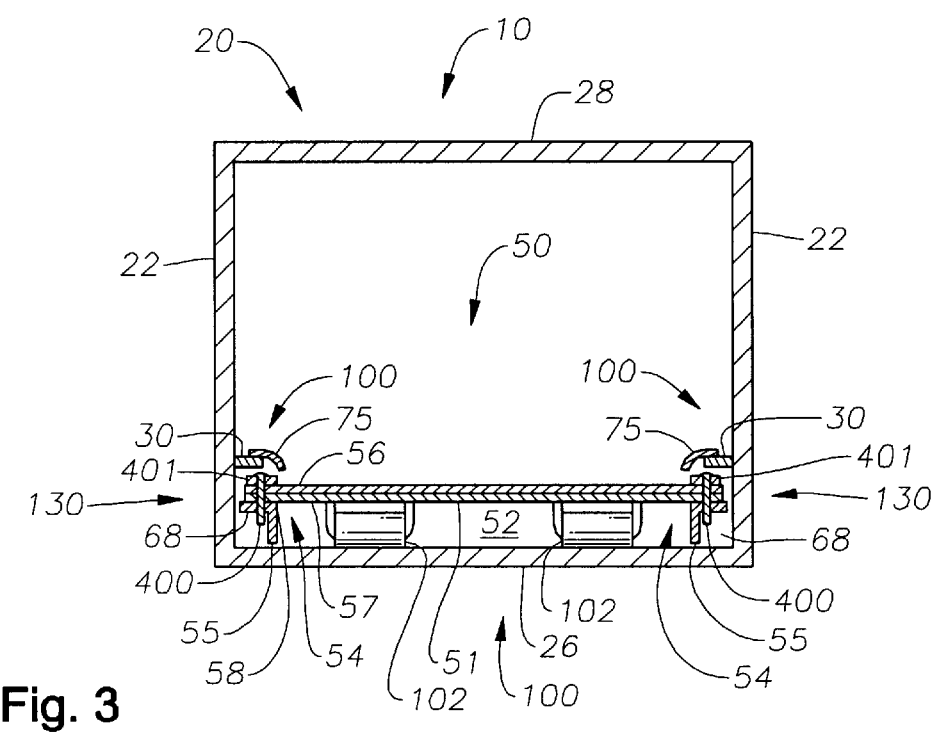
FIG. 3 is a cross-sectional view of the system, including a first filter assembly in a vacuum container.
Figure 4:
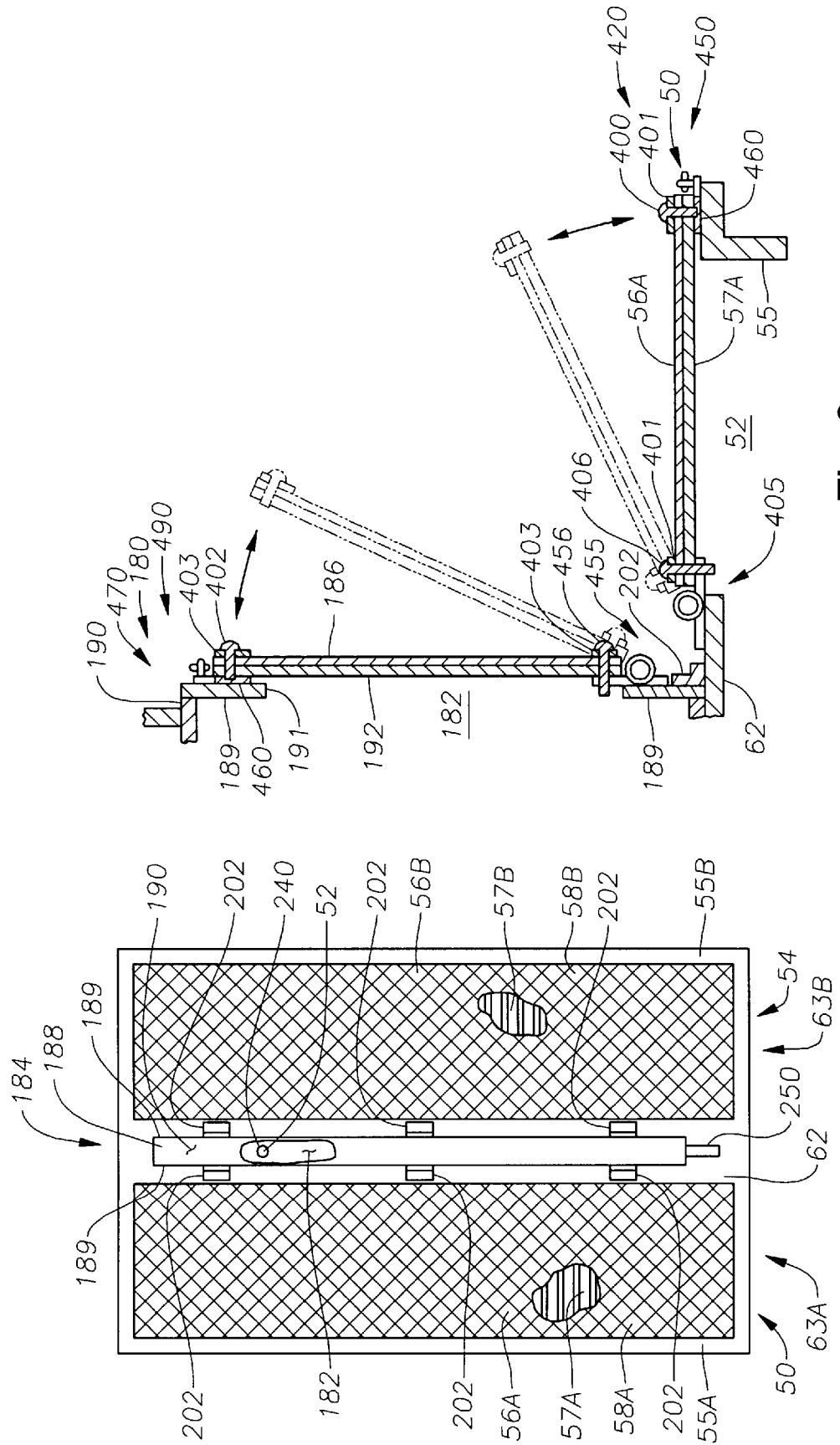
FIG. 4 is a partial cut-away top view of the first and second filter assemblies.

As best seen in FIGS. 1, 3, and 4, first filter assembly 50 comprises a first rigid filter support 54 and a first filter media 56 constructed to permit the flow of filtrate therethrough. First filter media 56 is disposed on and is attached to first rigid filter support 54. First filter media 56 is constructed from material which permits the flow of filtrate therethrough and which prevents the flow of sludge solids therethrough. First filtrate cavity 52 is at least partially defined by first filter assembly 50. Thus, filtrate which passes through first filter assembly 50 flows into first filtrate cavity 52.

First filter assembly 50 is positioned within container 20, preferably proximate container bottom 26, so that first filter media 56 is distal container bottom 26. First filter assembly 50 is preferably constructed and positioned to be maintained below the sludge when container 20 includes sludge therein thereby facilitating maintenance of a differential pressure in first filtrate cavity 52 that is lower than the atmospheric pressure. In the preferred embodiment, first filter assembly 50 extends horizontally proximal to container bottom 26. Further, in the preferred embodiment, first filter assembly 50 substantially conforms to the shape and size of container bottom 26. Thus, first filter assembly 50 forms a false bottom below which the sludge cannot flow, and first filter assembly 50 is maintained below the sludge when the container 20 has sludge therein.

In one preferred embodiment, first rigid filter support 54 comprises a first frame 55 (see also 55A and 55B in FIG. 4) and a first filter panel 57 (see also 57A and 57B in FIG. 4). First frame 55 includes a first frame opening 58 substantially covering the majority of first frame 55. First filter panel 57 covers first frame opening 58 and is attached to first frame 55. First filter media 56, in turn, is disposed on first filter panel 57 and is also attached to first frame 55. In the preferred embodiment as shown in FIG. 3, first filter panel 57 and first filter media 56 are attached to first frame 55 by use of a plurality of first bolt connectors 400. Preferably, in this embodiment, a first support structure 401 preferably substantially the same size and shape of first frame 55, is disposed on top of first filter media 56. Each first bolt 400 is then inserted through aligned holes in the first support structure 401, first filter media 56, first filter panel 57, and first frame 55. It should be noted that for purposes of clarity, such attachments are not illustrated in FIGS. 2, 4, 6, and 8. In this embodiment and as best shown in FIG. 3, first filtrate cavity 52 is defined by first filter panel 57 and container bottom 26.

First filter panel 57 is at least of equal porosity as first filter media 56 so that it allows the passage of any filtrate which flows through filter media 56. In normal circumstances, first filter panel 57 has a greater porosity than first filter media 56. First filter panel 57 may be constructed of a substantially rigid porous material that provides support to first filter media 56. Acceptable materials for constructing first filter panel 57 include expanded metal, perforated plate, wedge wire, plastic or regular mono-filament mesh, or mono-multifilament mesh.

In one preferred embodiment as best seen in FIG. 3, the plurality of container side walls 22, excluding container gate side wall 24, include a shoulder 30 proximate container bottom 26. In this embodiment including shoulder 30, first filter assembly 50 includes a lip 68. Lip 68 preferably extends from first rigid filter support 54 from all sides of first rigid filter support 54 except the side proximate gate side wall 24. Lip 68, shoulder 30, and first rigid filter support 54 are sized and constructed so that lip 68 is directly underneath shoulder 30 when first filter assembly 50 is positioned within container 20. It is noted that lip 68 and shoulder 30 need not be continuous around the edges of container 20 and first filter assembly 50. Lip 68 and shoulder 30 may also comprise intermittent sets of matching lip and shoulder sections.

In the preferred embodiment including shoulder 30, a substantially flexible gasket 75 is attached around the perimeter of shoulder 30. A portion of gasket 75 overhangs the free end of shoulder 30 so that the overhanging portion of gasket 75 is directly above a section of lip 68. As sludge is introduced into container 20, the overhanging portion of gasket 75 is forced down (by the sludge) into sealing abutment with lip 68 (and/or first support structure 401). Thus, gasket 75 enables a sealing connection between first filter assembly 50 and container 20. The sealing connection, in turn, aids in the vacuum filtration of sludge in the embodiment in which lip 68 and shoulder 30 are continuous.

In another preferred embodiment as best seen in FIG. 10, first filter assembly 50 includes a lip 68 as well as an extension 76. Lip 68 preferably extends outwardly from first rigid filter support 54 from all sides of first rigid filter support 54 except the side proximate gate side wall 24. Extension 76 is securely fastened to lip 68 by means well-known in the art (such as bolts), preferably completely surrounds lip 68, and extends outwardly from lip 68. Lip 68 and extension 76 are preferably sized and constructed so that extension 76 is at least immediately adjacent to, and preferably contacts, the plurality of container side walls 22, excluding gate side wall 24, when first filter assembly 50 is positioned within container 20. Extension 76 thus provides a seal between the first rigid filter support 54 and the container 20 so that sludge does not seep underneath first filter assembly 50 without first being filtered by first filter media 56.

In one embodiment, extension 76 is constructed from a rigid material, such as steel. Thus, in this embodiment, the dimensions of extension 76 and lip 68 must be fairly exact in order for first filter assembly 50 to fit within container 20 while being immediately adjacent to the plurality of container side walls 22, excluding gate side wall 24.

Figure 13:
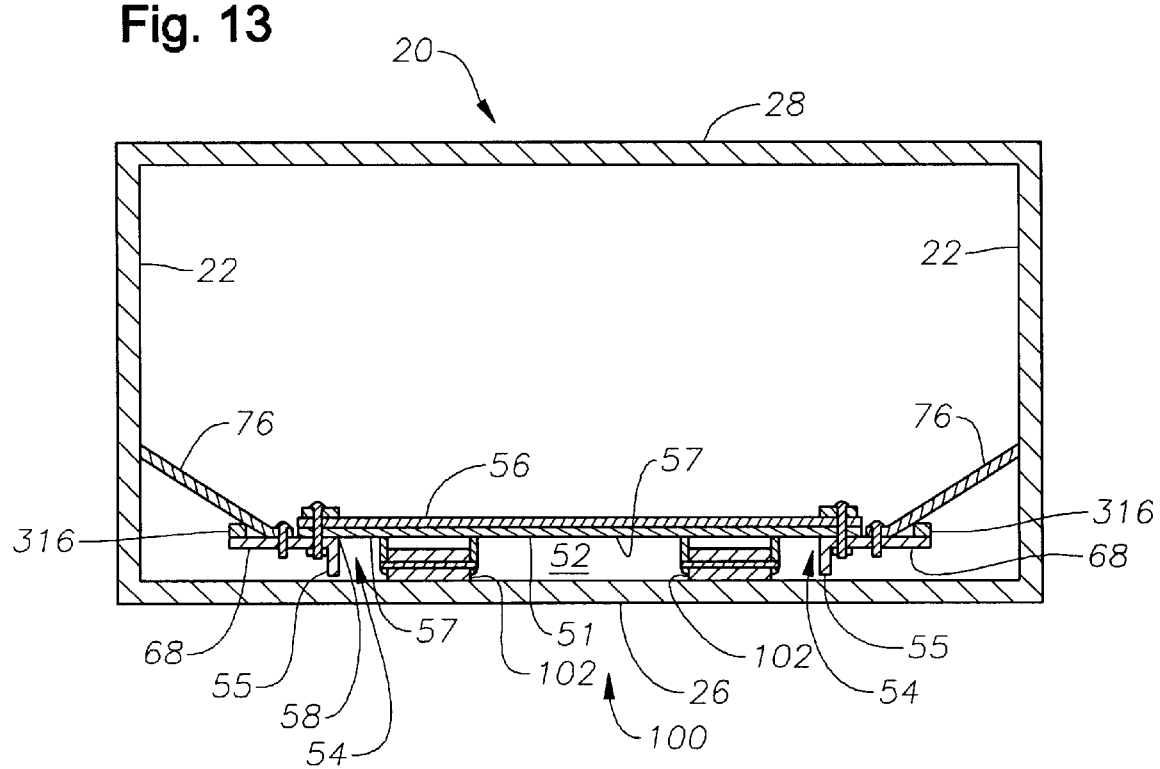
FIG. 13 is a cross-sectional view of the system, including a first filter assembly having extensions in a vacuum container.

In another embodiment as shown in FIG. 13, extension 76 is constructed from a flexible material, such as rubber. In this embodiment, since its material is flexible, extension 76 may be long enough to bend on container side walls 22, excluding gate side wall 24. Thus, in this embodiment, the length of extension 76 is not as critical, provided extension 76 is at least long enough to contact container side walls 22, excluding gate side wall 24.

In the preferred embodiment shown in FIG. 11, first filter assembly 50 includes a means for adjusting 300 the extension 76 so as to better enable an operator to ensure the creation and maintenance of a seal between first filter assembly 50 and container 20. In this preferred embodiment including means for adjusting 300, extension 76 should be divided into a plurality of extension sections 77. Each extension section 77 corresponds and is proximate to one of the container side walls 22 (excluding gate side wall 24). Being divided into extension sections 77, each extension section 77 is adjusted, through the means for adjusting 300, to create a seal with its corresponding container side wall 22. Notably, because each extension section 77 is a separate component, a gap 78 typically remains at each corner of the container 20 opposite gate side wall 24. Filler material 79, such as additional rubber components, should be used to fill each gap 78 so as to complete the seal between first filter assembly 50 and container 20.

Means for adjusting 300 preferably comprises a plurality of rows 302 of lip openings 304, each row 302 including a plurality of lip openings 304 thereon. Each lip opening 304 preferably extends through lip 68. In this embodiment, means for adjusting 300 also comprises a plurality of extension openings 306 on each extension section 77. Each extension opening 306 extends through its corresponding extension section 77. At least one extension opening 306 corresponds to each lip opening row 302. In this embodiment, means for adjusting 300 also comprises a plurality of extension fasteners 308 that are removably insertable through each lip opening 304 and extension opening 306.

Lip 68, extension sections 77, lip openings 304, and extension openings 306 are sized and constructed so that all extensions openings 306 of each extension section 77 can be concurrently axially aligned with one lip opening 304 of its corresponding lip opening row 302. Also, by adjusting extension section 77 either towards or away from its corresponding container side wall 22, all extension openings 306 of each extension 77 should become axially aligned with another lip opening 304 of the corresponding lip opening row 302. Extension fasteners 308 are sized to be removably insertable into and through axially aligned extension and lip openings, 306 and 304, thereby securing extension section 77 to lip 68.

In one preferred embodiment as shown in FIG. 13, first filter assembly 50 includes a lifting bar 316 fixedly attached to lip 68. Extension 76 (or extension sections 77 in the relevant embodiment) rests on lifting bar 316 so that lifting bar 316 props extension 76 (or extension sections 77) upwards so that the angle between extension 76 and the corresponding container side wall 22 is an acute angle. In this embodiment including lifting bar 316, extension 76 (or extension sections 77) is preferably constructed from a flexible material.

The inclusion of flexible extension 76 (or flexible extension sections 77), and particularly the inclusion of lifting bar 316 and means for adjusting 300, enables first filter assembly 50 (first rigid filter support 54 and media 56) to be smaller and still maintain and create a seal against container 20.

Figure 12:
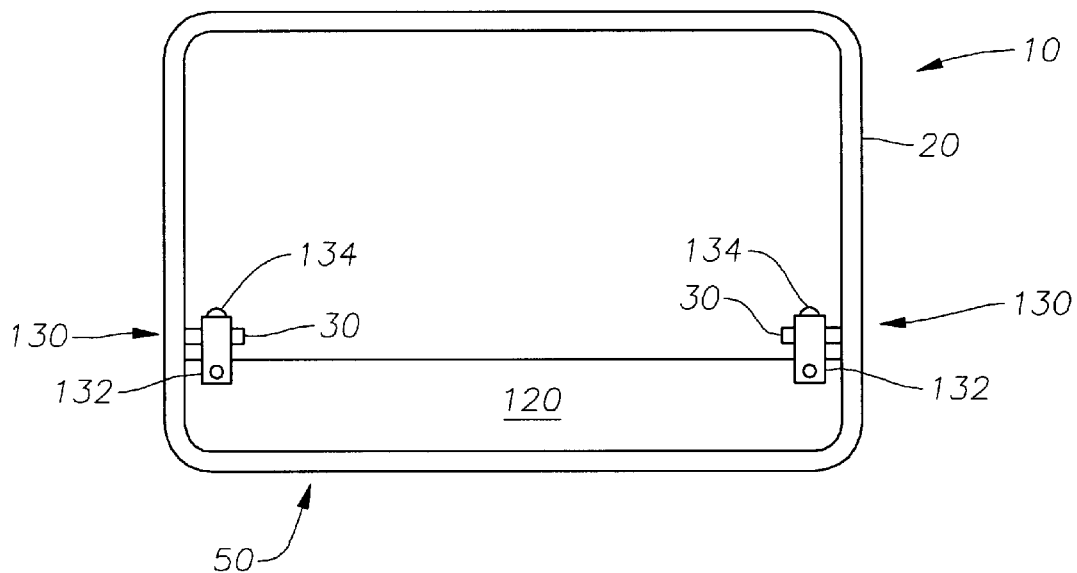
FIG. 12 is a front elevational view of the system, excluding the gate side wall, with the first filter assembly located within the container.

As best seen in FIGS. 1 and 12, first filter assembly 50 also includes a front sealing member 120 that creates and maintains a seal between first filter assembly 50 and container 20 proximate gate side wall 24. Front sealing member 120 preferably extends from the side of first rigid filter support 54 proximate gate side wall 24 downwardly to completely cover the vertical space bounded by first rigid filter support 54, container bottom 26, and the two container side walls 22 adjacent gate side wall 24. In one embodiment, front sealing member 120 is constructed from a rigid material, such as steel. In another embodiment, front sealing member 120 is constructed from a flexible material, such as rubber.

System 10 also preferably includes a first means for evacuating 70 filtrate from first filtrate cavity 52. In the preferred embodiment, first means for evacuating 70 comprises at least one first filter assembly filtrate drain 72. Each first filter assembly filtrate drain 72 is in fluid communication with first filtrate cavity 52. Preferably, each first filter assembly filtrate drain 72 is located proximate or on container bottom 26. Each first filter assembly filtrate drain 72 is also in fluid communication with the exterior of container 20.

Each first filter assembly filtrate drain 72 can be connected to a first pump means for creating a differential pressure that is lower than the atmospheric pressure in the first filtrate cavity 52. If first filter assembly 50 is completely covered by sludge, first pump means may thus be utilized to provide vacuum filtration through first filter assembly 50 and vacuum evacuation of filtrate from first filtrate cavity 52. If first filter assembly 50 is not completely covered by sludge, then filtrate passes through first filter assembly 50 into first filtrate cavity 52 by way of gravity and first pump means aids in evacuating the filtrate from first filtrate cavity 52. First pump means may comprise any type of liquid pump capable of operating under "dry" conditions but is preferably a peristalic pump or a diaphragm pump.

System 10 preferably includes a means for selectively slidably removing 100 first filter assembly 50 from container 20 when container 20 does not contain sludge therein. In the preferred embodiment, means for selectively slidably removing 100 selectively slidably removes first filter assembly 50 through container gate side wall 24 when container gate side wall 24 is in its open position 25.

In the preferred embodiment and as best seen in FIG. 3, means for selectively slidably removing 100 comprises a plurality of casters 102. Each of the plurality of casters 102 is removably attached to the underside 51 of first filter assembly 50. The plurality of casters 102 are sized and constructed so that the casters 102 extend to container bottom 26 when first filter assembly 50 is securely positioned within container 20. Thus, when first filter assembly 50 is pulled from container 20 through container gate side wall 24 (in the open position 25), the plurality of casters 102 roll on container bottom 26 thereby enabling first filter assembly 50 to be selectively slidably removed from container 20.

System 10 further preferably comprises a means for securing 130 first filter assembly 50 within container 20 so as to prevent first filter assembly 50 from moving in both the horizontal and vertical directions. In the embodiment including shoulder 30 and lip 68, means for securing 130 comprises shoulder 30 and lip 68 as well as at least one locking tab 132. As previously disclosed, shoulder 30 is directly above lip 68 which prevents the vertical displacement of first filter assembly 50. Locking tab 132, as shown in FIG. 12, is fixedly attached to first filter assembly 50 and is removably attached to container 20 so that, when locking tab 132 is attached to container 20, it prevents the horizontal displacement of first filter assembly 50. Preferably, one locking tab 132 is fixedly attached to either side of front sealing member 120 and is removably attached to shoulder 30. Removable attachment preferably consists of a locking tab fastener 134 removably inserted through an axially aligned shoulder hole and a locking tab hole.

Figure 14:
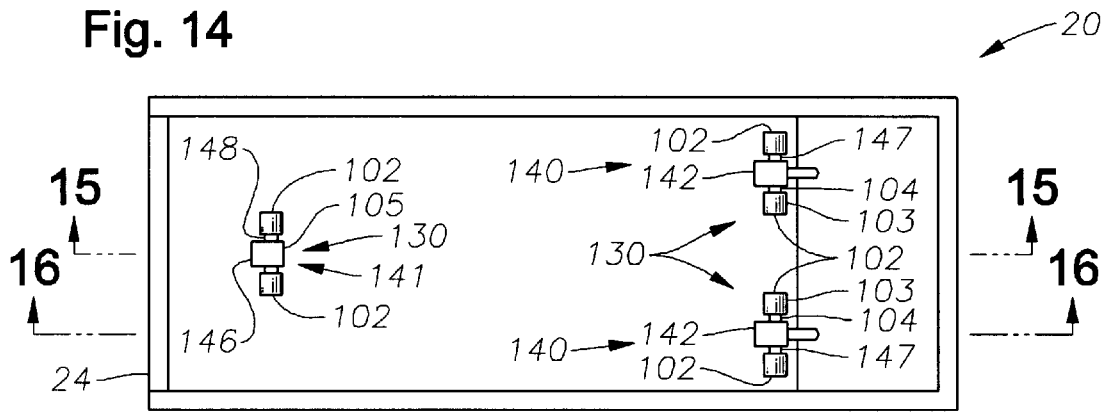
FIG. 14 is a top view of the container including one embodiment of the means for securing, with the casters and axles of first filter assembly shown in proper position for illustrative purposes.
Figure 15:
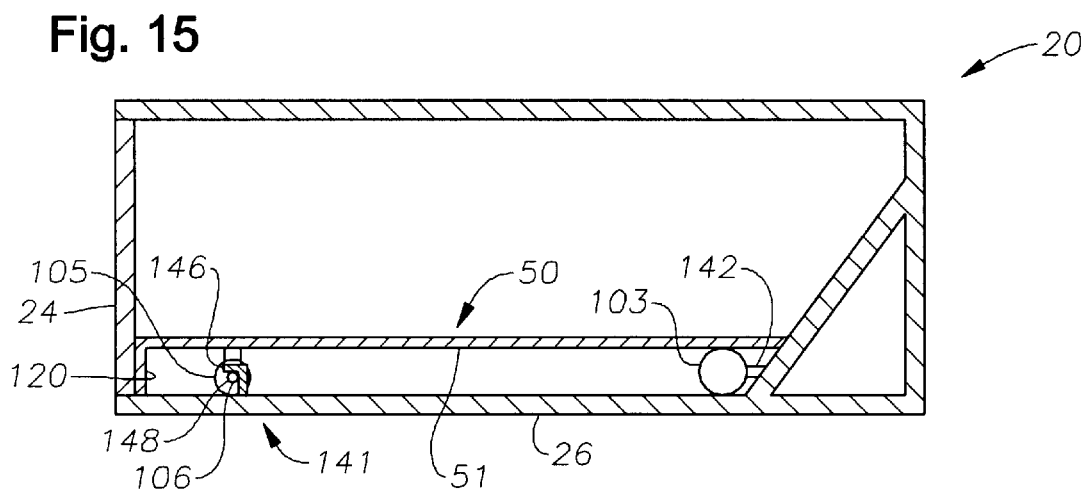
FIG. 15 is a cross-sectional view taken along line 15—15 of FIG. 14.
Figure 16:
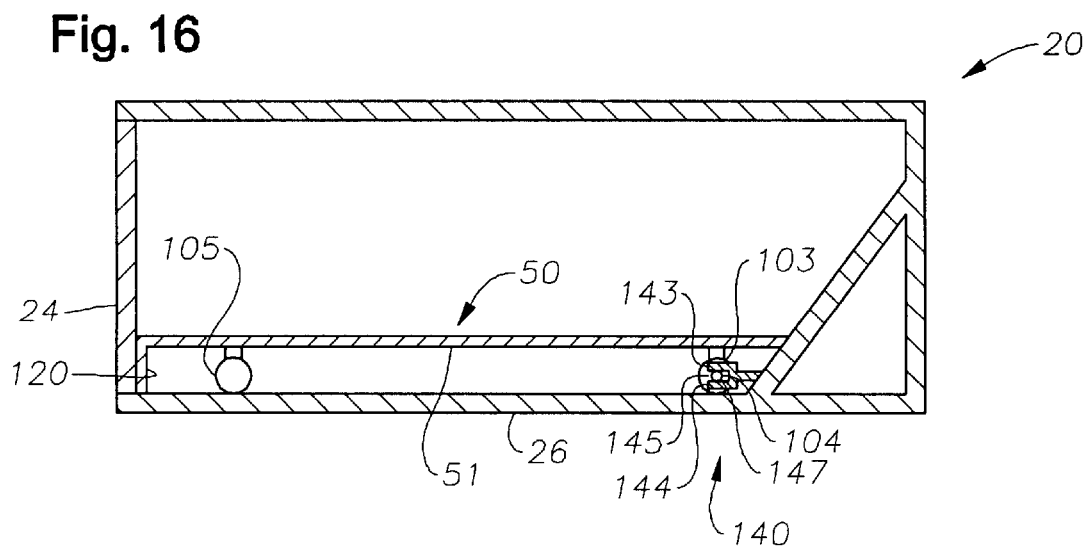
FIG. 16 is a cross-sectional view taken along line 16—16 of FIG. 14.

In another preferred embodiment as shown in FIGS. 14–16, means for securing 130 comprises at least one detainer 140 and a hook 141 as well as at least one locking tab 132 similar to the previous embodiment. This embodiment is preferably utilized when container 20 does not include shoulder 30. Detainer 140 comprises a unshaped member 142 having a first portion 143 and a second portion 144, each parallel to container bottom 26, with a space 145 defined therebetween. Detainer 140 is preferably fixedly attached to the container side wall 22 opposite gate side wall 24. Preferably, system 10 includes two detainers 140, one on each side of such container side wall 22. Hook 141 extends from container bottom 26 with its open face 146 proximate gate side wall 24.

In the embodiment including detainer 140 and hook 141, first filter assembly 50 includes a detainer rod 147 for each detainer 140 and a hook rod 148, each preferably extending from the underside 51 of first filter assembly 50. Each detainer 140 and corresponding detainer rod 147 is sized and constructed so that detainer rod 147 is received within the space 145 of detainer 140 when first filter assembly 50 is positioned within container 20. Hook 141 and hook rod 148 are also sized and constructed so that hook rod 148 is received within the open face 146 of hook 141 when first filter assembly 50 is positioned within container 20. In the preferred embodiment, detainer rods 147 comprise the axles 104 of rear casters 103 and hook rod 148 comprises the axle 106 of a front caster 105. When detainer rod 147 is received by detainer 140 and when hook rod 148 is received by hook 141, detainer first portion 143 and the top section of hook 141 prevent the vertical displacement of first filter assembly.

Similar to the previous embodiment, in this embodiment at least one locking tab 132 prevents the horizontal displacement of first filter assembly 50 within container 20. In this embodiment, locking tab 132 is fixedly attached to first filter assembly 50 and is removably attached to container 20 so that, when locking tab 132 is attached to container 20, it prevents the horizontal displacement of first filter assembly 50. Preferably, one locking tab 132 is fixedly attached to either side of front sealing member 120 and is removably attached to a latch on one of the container side walls 22. Removable attachment preferably consists of a locking tab fastener 134 removably inserted through an axially aligned latch hole and a locking tab hole.

Detainer 140, detainer rod 147, hook 141, and hook rod 148 are sized, located, and constructed so that, when first filter assembly 50 is being placed within container 20: [1] detainer rods 147 unobtrusively travel towards detainers 140; [2] hook 141 does not present an obstacle to the placement of first filter assembly 50 within container 20; [3] hook rod 148 unobtrusively travels towards hook 141; and [4] detainers 140 do not present an obstacle to the placement of first filter assembly 50 within container 20.

Figure 5:
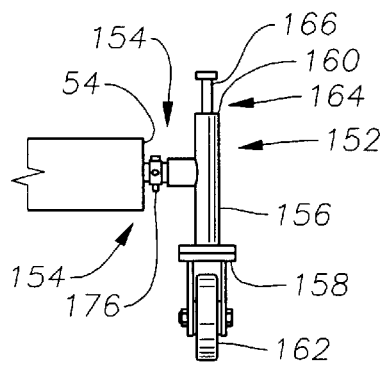
FIG. 5 is a front elevational view of a wheeled leg attached to the first filter assembly.
Figure 6:
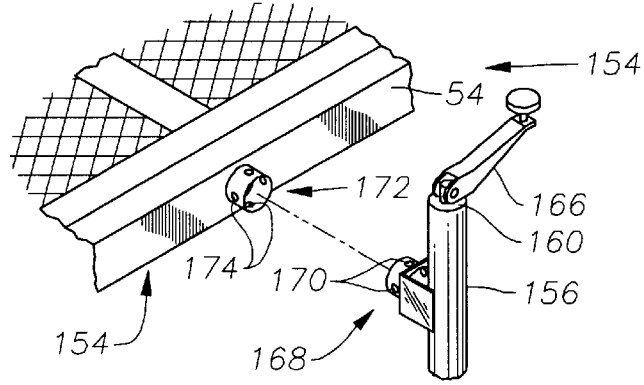
FIG. 6 is an exploded view of a wheeled leg and its corresponding assembly receiver.

As best seen in FIGS. 1, 5, and 6, system 10 also preferably includes a means for stabilizing 150 first filter assembly 50 when first filter assembly 50 is removed from container 20. Means for stabilizing 150 comprises a plurality of wheeled legs 152 and a means for removably attaching 154 the plurality of wheeled legs 152 to first filter assembly 50. Preferably, each of the plurality of wheeled legs 152 is extendible.

In the preferred embodiment, each of the wheeled legs 152 comprises a tubular body 156, a wheel 162 attached at the bottom end 158 of tubular body 156, and a jacking mechanism 164. Jacking mechanism 164 enables the length of wheeled leg 152 to be extended or contracted so that each wheeled leg 152 is able to stabilize first filter assembly 50 for a given variety of heights between first filter assembly 50 and the ground. Jacking mechanism 164 includes an activating crank 166 positioned at a location on wheeled leg 152 that is easily accessible to a user, such as the top end 160 of tubular body 156. Activating crank 166 activates jacking mechanism 164 thereby adjusting (extending or contracting) the length of wheeled leg 152.

Also in the preferred embodiment, means for removably attaching 154 the plurality of wheeled legs 152 to first filter assembly 50 comprises a wheeled leg insert 168 on each wheeled leg 152, an assembly receiver 172 for each of the wheeled leg inserts 168, and a fastener 176 for each set of wheeled leg inserts 168 and assembly receivers 172. Each wheeled leg insert 168 preferably extends from tubular body 156, and each assembly receiver 172 preferable extends from first rigid filter support 54. Each set of wheeled leg inserts 168 and assembly receivers 172 is constructed and sized to be mateable so that the wheeled leg insert 168 is insertable into its corresponding assembly receiver 172 (or vice versa in an alternative embodiment).

Each wheeled leg insert 168 includes at least one insert hole 170 therethrough. In addition, each assembly receiver 172 includes at least one receiver hole 174 therethrough. The insert hole 170 and receiver hole 174 for each set of wheeled leg inserts 168 and assembly receivers 172 are sized and constructed so that they are concentrically aligned when the wheeled leg insert 168 is inserted into the assembly receiver 172. The concentric alignment of the insert hole 170 and receiver hole 174 enable the insertion of the corresponding fastener 176 therein. With such insertion, the fastener 176 securely attaches the wheeled leg 152 to the first filter assembly 50.

In the preferred embodiment, and as shown in FIGS. 1, 2, 4, and 7–9, system 10 further comprises a second filter assembly 180 constructed to permit the flow of filtrate therethrough. Second filter assembly 180 comprises a second rigid filter support 184 and a second filter media 186. Second filter media 186 is disposed on and attached to second rigid filter support 184. Second filter media 186 is constructed from material which permits the flow of filtrate therethrough and which prevents the flow of sludge solids therethrough. Second filtrate cavity 182 is defined within second filter assembly 180. Thus, filtrate which passes through second filter assembly 180 flows into second filtrate cavity 182.

Figure 7:
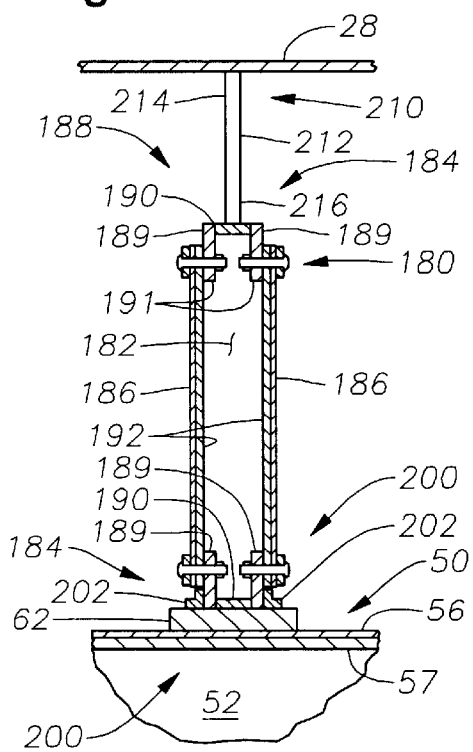
FIG. 7 is a cross-sectional view of the second filter assembly and its attachment to the first filter assembly.

In the preferred embodiment, second rigid filter support 184 comprises a second filter support box 188. Second rigid filter support box 188 generally comprises two second frames 189 joined at their perimeters by a second frame connector 190. Each of the two second frames 189 includes a second frame opening 191 substantially covering the majority of each second frame 189. A second filter panel 192 covers each of the second frame openings 191 and is attached to its corresponding second frame 189. Second filter media 186, in turn, is disposed on each of the second filter panels 192 and is also attached to its corresponding second frame 189. In the preferred embodiment and as shown in FIG. 7, second filter panels 192 and second filter media 186 are attached to their corresponding second frame 189 by use of a plurality of second bolt connectors 402. Preferably in this embodiment, a second support structure 403, preferably substantially the same size and shape as second frame 189, is disposed on top of each second filter media 186. Each second bolt 402 is then inserted through aligned holes in the second support structure 403, second filter media 186, second filter panel 192, and second frame 189. It should be noted that for purposes of clarity, such attachments are not illustrated in FIGS. 2, 4, 6, and 8. Second filtrate cavity 182 thus comprises the hollow interior of second rigid filter support box 188.

Second filter panel 192 is at least of equal porosity as second filter media 186 so that it allows the passage of any filtrate which flows through filter media 186. In normal circumstances, second filter panel 192 has a greater porosity than second filter media 186. Second filter panel 192 may be constructed of a substantially rigid porous material that provides support to second filter media 186. Acceptable materials for constructing second filter panel 192 include expanded metal, perforated plate, wedge wire, plastic or regular mono-filament mesh, or mono-multifilament mesh.

Second filter assembly 180 is positioned within container 20, preferably extending from first filter assembly 50 in a direction distal to container bottom 26. In the preferred embodiment, second filter assembly 180 extends vertically from first filter assembly 50.

In the embodiment including second filter assembly 180, and as best seen in FIGS. 4, 7, and 9, first filter assembly 50 (first frame 55) preferably includes a frame attachment member 62 disposed lengthwise thereon. Second filter assembly 180 is attached to and extends from frame attachment member 62. In one embodiment, as shown in FIG. 7, frame attachment member 62 is located on top of first filter panel 57 and first filter media 56. In another embodiment, as shown in FIGS. 4 and 9, frame attachment member 62 separates first filter assembly 50 into two sections, 63A and 63B, each of which includes a first filter panel, 57A and 57B, a first filter media, 56A and 56B, and a first frame opening, 58A and 58B. In this embodiment each first filter panel, 57A and 57B, as well as each first filter media, 56A and 56B, is disposed over its corresponding first frame opening, 58A and 58B, and is attached to its corresponding first frame, 55A and 55B, and to frame connecting member 62.

In one embodiment, second filter assembly 180 is fixedly attached, by common means, to first filter assembly 50 (preferably to frame connecting member 62 in the embodiment including the same). In an alternative embodiment as shown in FIGS. 4, 7, and 9, system 10 further comprises a means for selectively removably attaching 200 second filter assembly 180 to and from first filter assembly 50. Means for selectively removably attaching 200 preferably comprises a plurality of guiding members 202 (preferably angle brackets) fixedly attached to first filter assembly 50. Guiding members 202 are preferably attached to frame connecting member 62, in the embodiment including the same. The plurality of guiding members 202 are attached to first filter assembly 50 so that they form a channel into which second filter assembly 180 can be inserted. By the use of bolts, through corresponding openings in the guiding members 202 and second filter assembly 180, second filter assembly 180 can be removably attached to first filter assembly 50.

In the embodiment including second filter assembly 180 and as shown in FIGS. 2 and 7, system 10 further preferably comprises a means for fastening 210 second filter assembly 180 in place within container 20. In the preferred embodiment, means for fastening 210 comprises at least one connecting member 212, each connecting member having a first end 214 and a second end 216. Each connecting member 212 is attached at its first end 214 to container 20, preferably to one of the plurality of container side walls 22 in the embodiment including an open-top box (see FIG. 2) and preferably to container top 28 in the embodiment including a vacuum box (see FIG. 1). Each connecting member 212 is attached at its second end 216 to second filter assembly 180, preferably to the second rigid filter support 184 or to second frame connector 190 distal to container bottom 26.

In one embodiment as seen in FIG. 4, second filtrate cavity 182 is in fluid communication with first filtrate cavity 52 by way of at least one communication conduit 240. In this embodiment, the filtrate within second filtrate cavity 182 drains into first filtrate cavity 52 through communication conduit 240 and is then evacuated from first filtrate cavity 52 by first means for evacuating 70. Thus, in this embodiment, first means for evacuating 70 evacuates the filtrate from both first filtrate cavity 52 and from second filtrate cavity 182.

Figure 8:
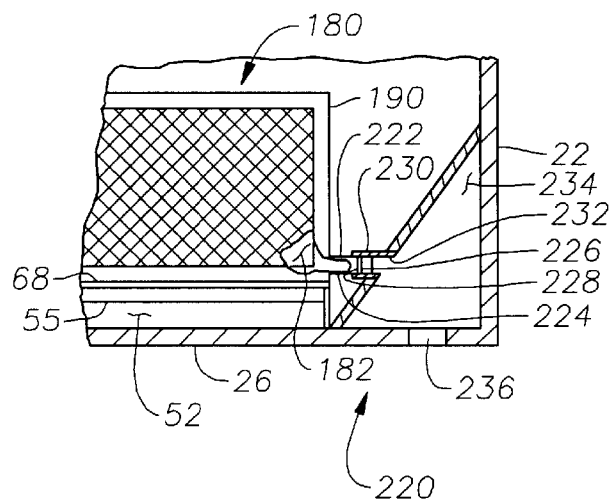
FIG. 8 is a side elevational view with the container in cross-section showing the second means for evacuating.

In another embodiment as shown in FIG. 8, system 10 further comprises a second means for evacuating 220 for evacuating filtrate from second filtrate cavity 182. In the preferred embodiment, second means for evacuating 220 comprises a hollow finger 222 extending from second filter assembly 180 and a container receiver 230 extending from one of the plurality of container side walls 22, preferably the container side wall 22 opposite container gate side wall 24. Hollow finger 222 is in fluid communication with second filtrate cavity 182, and is preferably located on second frame connector 190 proximate container bottom 26. Hollow finger 222 and container receiver 230 are sized and constructed so that hollow finger 222 is insertable into and in fluid communication with container receiver 230 when second filter assembly 180 is properly positioned within container 20.

Container receiver 230 includes a container receiver inner surface 232. Hollow finger 222 includes a hollow finger outer surface 224. Preferably, at least one groove 226 is formed around the perimeter of hollow finger outer surface 224, with a seal 228 disposed within each of the formed grooves 226. Thus, when hollow finger 222 is inserted into container receiver 230, each of the seals 228 sealably engages container receiver inner surface 232.

In the preferred embodiment including container receiver 230, container 20 further comprises a chamber 234 sealed from first filtrate cavity 52. Chamber 234 is in fluid communication with container receiver 230, and includes at least one second filter assembly filtrate drain 236. Each second filter assembly filtrate drain 236 is in fluid communication with the exterior of container 20.

In the preferred embodiment including container receiver 230, each second filter assembly filtrate drain 236 can be connected to a second pump means for creating a differential pressure that is lower than the atmospheric pressure in the second filtrate cavity 182. If second filter assembly 180 is completely covered by sludge, second pump means may thus be utilized to provide vacuum filtration through second filter assembly 180 and vacuum evacuation of filtrate from second filtrate cavity 182. If second filter assembly 180 is not completely covered by sludge, then filtrate passes through second filter assembly 180 into second filtrate cavity 182 by way of gravity and second pump means aids in evacuating the filtrate from second filtrate cavity 182. Second pump means may comprise any type of liquid pump capable of operating under "dry" conditions but is preferably a peristalic pump or a diaphragm pump.

In order to aid in the sliding removal of first filter assembly 50 and/or second filter assembly 180 from container 20, system 10 also preferably comprises a grommet 250 that is easily accessible from the exterior of container 20 when container gate side wall 24 is in its open position 25. Grommet 250 is preferably attached to second frame connector 190, in the embodiment including the same. Grommet 250 is also attachable to first rigid filter support 54, to second rigid filter support 184, or to both first and second rigid filter supports, 54 and 184.

In the preferred embodiment as shown in FIG. 9, first filter assembly 50 and/or second filter assembly 180 are constructed to enable the easy access into first filtrate cavity 52 and second filtrate cavity 182, respectively. In this embodiment, first filter panel 57 and first filter media 56 are hingedly attached to first frame 55, preferably to frame attachment member 62. In this embodiment, second filter panel 192 and second filter media 186 are hingedly attached to second frames 189, preferably proximate first filter assembly 50.

Preferably in this embodiment, first filter panel 57 and first filter media 56 are attached, at their ends proximate frame attachment member 62, to at least one first hinge 405. Such attachment is preferably enabled by the insertion of a first hinge bolt connector 406 through aligned holes in the first support structure 401, first filter media 56, first filter panel 57, and first hinge 405. At least one first hinge 405 is, in turn, attached by means well-known in the art (such as bolts) to frame attachment member 62. At least one first hinge 405 preferably comprises a plurality of first hinges 405 located along the length of frame attachment member 62.

In this embodiment, the free ends 420 of first filter media 56 and first filter panel 57 opposite first hinges 405 are also not fixedly attached to first frame 55. First filter media 56 and first filter panel 57 are fixedly attached to each other, however, through the insertion of a first bolt connector 400 into aligned holes in the first support structure 401, first filter media 56, and first filter panel 57. Such attachment may also include a lower first support member 410 into which first bolt connector 400 is inserted and which runs intermediate first frame 55 and first filter panel 57 along free ends 420.

In this embodiment, system 10 also includes a first means for selectively securing 450 the free ends 420 of first filter media 56 and first filter panel 57. First means for selectively securing 450 may comprise any suitable releasable locking mechanism known in the art, such as a twist lock, a latch and bolt, or a key lock.

Preferably in this embodiment, second filter panel 192 and second filter media 186 are attached, at their ends proximate first filter assembly 50, to at least one second hinge 455. Such attachment is preferably enabled by the insertion of a second hinge bolt connector 456 through aligned holes in the second support structure 403, second filter media 186, second filter panel 192, and second hinge 455. At least one second hinge 455 is, in turn, attached by means well-known in the art (such as bolts) to second frame 189, preferably proximate first filter assembly 50.

In this embodiment, the free ends 470 of second filter media 186 and second filter panel 192 opposite second hinges 455 are also not fixedly attached to second frame 189. Second filter media 186 and second filter panel 192 are fixedly attached to each other, however, through the insertion of a second bolt connector 402 into aligned holes in the second support structure 403, second filter media 186, and second filter panel 192. Such attachment may also include a lower second support member 460 into which second bolt connector 402 is inserted and which runs intermediate second frame 189 and second filter panel 192 along free ends 470.

In this embodiment, system 10 also includes a second means for selectively securing 490 the free ends 470 of second filter media 186 and second filter panel 192. Second means for selectively securing 490 may comprise any suitable releasable locking mechanism known in the art, such as a twist lock, a latch and bolt, or a key lock.

IN OPERATION

Generally, in operation, sludge is introduced into container 20 through container inlet 32, filtrate passes through first filter assembly 50 into first filtrate cavity 52, and filtrate is evacuated from first filtrate cavity 52 by first means for evacuating 70. If the embodiment also includes a second filter assembly 180, then filtrate passes through second filter assembly 180 into second filtrate cavity 182, and filtrate is evacuated from second filtrate cavity 182 by first means for evacuating 70 or by second means for evacuating 220, depending on the embodiment. Sludge solids remain interior to container 20 and exterior to first and second filter cavities, 52 and 182.

If sludge completely covers first filter assembly 50 and first pump means is connected to first means for evacuating 70, then first pump means induces vacuum filtration through first filter assembly 50 by creating a differential in pressure across first filter assembly 50. Otherwise, filtrate drains through first filter assembly 50 by gravitational filtration.

In the embodiment in which second filtrate cavity 182 is in fluid communication with first filtrate cavity 52 through communication conduit 240, if sludge completely covers second filter assembly 180 and first pump means is connected to first means for evacuating 70, then first pump means also induces vacuum filtration through second filter assembly 180 by creating a differential in pressure across second filter assembly 180. In this same embodiment, if sludge does not completely cover second filter assembly 180, then only gravitational filtration is possible through both second filter assembly 180 and first filter assembly 50.

In the embodiment including second means for evacuating 220, if sludge completely covers second filter assembly 180 and second pump means is connected to second means for evacuating 220, then second pump means induces vacuum filtration through second filter assembly 180 by creating a differential in pressure across second filter assembly 180. Otherwise, filtrate drains through second filter assembly 180 by gravitational filtration.

With respect to first filter assembly 50, filtrate passes through first filter assembly 50, into first filtrate cavity 52, and out of container 20 through first filter assembly filtrate drains 72. With respect to second filter assembly 180 and in the embodiment in which second filtrate cavity 182 is in fluid communication with first filtrate cavity 52, filtrate passes through second filter assembly 180, into second filtrate cavity 182, into first filtrate cavity 52 (by way of communication conduit 240), and out of container 20 through first filter assembly filtrate drains 72. With respect to second filter assembly 180 and in the embodiment including second means for evacuating 220, filtrate passes through second filter assembly 180, into second filtrate cavity 182, through hollow finger 222 and container receiver 230, into chamber 234 (in the preferred embodiment), and out of container 20 through second filter assembly filtrate drains 236.

Once all filtrate has been removed from the sludge and from system 10 and once all sludge solids have been removed from within container 20, system 10 enables a user to easily and efficiently remove first filter assembly 50 (and second filter assembly 180, if included in the embodiment) from container cavity 23. The easy and efficient removal of first and second filter assemblies, 50 and 180, from container cavity 28 is important, particularly for the cleaning of container cavity 23 and first and second filter assemblies, 50 and 180. In turn, as previously explained, the cleaning of such components is critical for both the continued proper operation of system 10 and for safety purposes.

The removal of first and second filter assemblies, 50 and 180, from container 20 allows operators to clean the assemblies, 50 and 180, independently from container 20. Thus, the operators clean the container cavity 23 of empty container 20 as well as the unobstructed first and second filter assemblies, 50 and 180. Isolating the empty container cavity 23 from the filter assemblies, 50 and 180, allows the cleaning of places and parts which would be difficult, if not impossible, to otherwise clean.

In the embodiment not including second filter assembly 180, in order to remove first filter assembly 50 from container 20, an operator must first position container gate side wall 24 in its open position 25. Next, the operator must desecure the means for securing 130 to thereby allow the displacement of first filter assembly 50 from container 20. In the embodiment including shoulder 30 and locking tab 132, the operator must detach locking tab 132 from shoulder 30 by removing locking tab fastener 134 from shoulder hole and locking tab hole. In the embodiment including detainer 140 and hook 141, the operator must also first detach locking tab 132 from container 20.

Next, the operator must pull first filter assembly 50 from container 20. In the preferred embodiment including grommet 250, the operator attaches one end of a cable to grommet 250 and the other end of the cable to a suitably powerful vehicle, such as a forklift. By gradually moving the vehicle in a direction away from container 20, the cable pulls on first filter assembly 50. Due to the inclusion of the means for selectively slidably removing 100, first filter assembly 50 gradually and easily slides out of container 20 as the cable pulls on first filter assembly 50. Essentially, as the cable pulls on first filter assembly 50, the plurality of casters 102 roll on container bottom 26. For the relevant embodiments, it is noted that detainer 140, hook 141, detainer rod 147, and hook rod 148 are sized, located, and constructed so that none of such components provide an obstruction or collide with any other components as first filter assembly 50 is removed from container 20.

The operator should continue pulling first filter assembly 50 out of container 20 until approximately two-thirds of first filter assembly 50 has been exposed exterior to container 20. It is noted that as first filter assembly 50 is being pulled out of container 20, first filter assembly 50 is a given distance away from the ground since container bottom 26 is also a given distance away from the ground. Thus, if first filter assembly 50 is simply completely pulled out of container 20, then first filter assembly 50 will abruptly slam to the ground, potentially resulting in damage or operator injury.

At this point, the operator must actuate the means for stabilizing 150 the first filter assembly 50 when it is removed from container 20. Each of the wheeled legs 152 must first be securely attached to first filter assembly 50. The wheeled leg insert 168 of each leg 152 is inserted into an assembly receiver 172, and a fastener 176 is inserted through the corresponding set of insert and receiver holes, 170 and 174. Thus, each leg 152 is securely attached to first filter assembly 50. The operator next activates jacking mechanism 164 by moving activating crank 166 thereby extending or contracting the length of leg 152 until the attached wheel 162 abuts the ground.

After all of the wheeled legs 152 are securely attached to first filter assembly 50 and all of the wheels 162 abut the ground, the operator may continue pulling first filter assembly 50 out of container 20. At this point, in addition to the casters 102 rolling on container bottom 26 and to first filter assembly lip 68 sliding on container shoulder 30, first filter assembly 50 also rolls on the ground by way of wheels 162. Once first filter assembly 50 is completely removed from container 20, first filter assembly 50 is supported solely by the wheeled legs 152 above the ground.

Being completely removed from container 20, first filter assembly 50 and container cavity 23 can then each be independently properly cleaned, as previously disclosed. After the components are cleaned properly, first filter assembly 50 is ready for re-insertion into container 20. Using the vehicle, first filter assembly 50 is pushed into container 20. It is noted that due to the use of wheeled legs 152 and as long as the length of the wheeled legs 152 has not been changed subsequent to removal, first filter assembly 50 is at the proper height for re-insertion into container 20 so that casters 102 roll on container bottom 26 and so that first filter assembly lip 68 slides on container shoulder 30. If the length of the wheeled legs 152 has been changed subsequent to removal, then the operator must activate jacking mechanism 164 in order to establish the proper height for re-insertion.

Once approximately one third of first filter assembly 50 is contained within container 20, the operator must remove the wheeled legs 152 from first filter assembly 50. Normally, a forklift should be used to re-insert the first filter assembly 50, which forklift, at this point, will support the non-inserted end of first filter assembly 50 in the air. The forklift then gradually pushes first filter assembly 50 back into container 20. For the relevant embodiments, it is noted that detainer 140, hook 141, detainer rod 147, and hook rod 148 are sized, constructed, and located so that [1] none of such components provide an obstruction or collide with any other components as first filter assembly 50 is re-inserted into container 20 and [2] hook rod 148 is automatically received by hook 141 and detainer rod 147 is automatically received by detainer 140 as first filter assembly 50 is re-inserted into container 20. Once fully inserted, locking tab 132 is re-connected (in the relevant embodiment), container gate side wall 24 is moved back to its closed position 27, and system 10 is ready to be used once again.

In the relevant embodiment, an effective seal between first filter assembly 50 and container 20 is achieved by shoulder 30, lip 68, gasket 75, and front sealing member 120, in one embodiment; and extension 76 (or extension sections 77 and filler material 79), container side walls 22, and front sealing member 120, in another embodiment. In the embodiment including extension sections 77, means for adjusting 300 further ensures the creation and maintenance of a seal between extension sections 77 and container side walls 22 by enabling extension sections 77 to be moved toward and away from container side walls 22. Notably, a smaller sized first filter assembly 50 (in relation to container 20) may require extension sections 77 to be moved closer to container side walls 22 in order to maintain and create a seal. Lifting bars 316, which create an acute angle between extension section 77 and container side walls 22, also aid in the creation and maintenance of a seal by providing a better angle at which extension sections 77 can bend on and seal with container side walls 22. It is also noted that a flexible extension 76 (or extension sections 77) can be bent against container side walls 22 so as to create a seal therewith and so as to enable different sizes of first filter assemblies 50 and containers 20 to be used together without the need of precise dimensions to create the seals. Seals are, of course, important in vacuum filtration.

In the embodiment also including second filter assembly 180, the steps and actions required for removal and re-insertion are those detailed previously (in relation to the removal and re-insertion of first filter assembly 50) in addition to the following several additional steps and actions.

Prior to removal from container 20, the operator must detach the means for fastening 210 second filter assembly 180 to container 20. Thus, the operator detaches each connecting member second end 216 that is attached to second filter assembly 180. In addition, in the embodiment including hollow finger 222 and container receiver 230, as first and second filter assemblies, 50 and 180, are pulled out of container 20, hollow finger 222 automatically retracts from container receiver 230. Thus, second filter assembly 180 is then separated and can be fully removed from container 20.

Once first and second filter assemblies, 50 and 180, are completely removed from container 20 and in the embodiment including means for selectively removably attaching 200 second filter assembly 180 to and from first filter assembly 50, the operator may detach second filter assembly 180 from first filter assembly 50. The operator provides for such detachment by detaching second filter assembly 180 from the guiding members 202. Being detached, first and second filter assemblies, 50 and 180, may be cleaned independently from each other.

Once the system 10 is ready for operation, the operator must first replace second filter assembly 180 into position and re-attach second filter assembly 180 to guiding members 202 (if second filter assembly 180 was detached in the first place). Once re-attached, first and second filter assemblies, 50 and 180, can be jointly re-inserted into container 20. As first and second filter assemblies, 50 and 180, are re-inserted into container 20 and in the embodiment including hollow finger 222 and container receiver 230, hollow finger 222 is eventually automatically re-inserted into container receiver 230. Next, the operator re-attaches each connecting member second end 216 to the proper location on second filter assembly 180 thereby re-fastening second filter assembly 180 to container 20. Once container gate side wall 24 is moved back to its closed position 27, system 10 is ready to be used once again.

To aid in the cleaning operation, in the embodiment including first hinges 405, an operator may desecure first means for selectively securing 450 so as to allow the free ends 420 of first filter media 56 and first filter panel 57 to be pivoted about first hinge 405. In addition, in the embodiment including second hinges 455, an operator may desecure second means for selectively securing 490 so as to allow the free ends 470 of second filter media 186 and second filter panel 192 to be pivoted about second hinges 455. First and second hinges, 405 and 455, and their enabling pivoting motion, allow an operator to clean inside the filter assemblies, 50 and 180, locations which would otherwise be difficult, it not impossible, to clean without disassembling system 10. Moreover, first and second hinges, 405 and 455, and their enabling pivoting motion, ensure that such cleaning operation can be performed quickly and efficiently. After cleaning, care should be taken to re-secure first and second means for selectively securing, 450 and 490.

Functionally applying system 10 including the removal and re-insertion of first and second filter assemblies, 50 and 180, from and into container 20 provides a novel and nonobvious method a method for dewatering sludge and a method for cleaning a sludge filtration system.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

What is claimed is:

1. A sludge filtration system, comprising:
   a container constructed to receive and maintain sludge therein;
   a first filter assembly positioned in said container;
   said first filter assembly defining a first filtrate cavity;
   said first filter assembly constructed and positioned to be maintained below said sludge when said container contains said sludge therein;
   thereby facilitating maintenance of a differential pressure in said first filtrate cavity that is lower than the atmospheric pressure;
   first means for evacuating filtrate from said first filtrate cavity; and
   means for selectively slidably removing said first filter assembly from said container when said container does not contain said sludge therein.

2. A system as in claim 1, wherein:
   said container having a gate side wall;
   said gate side wall having a closed and an open position; and
   said means for selectively slidably removing removing said first filter assembly through said gate side wall when said gate side wall is in said open position.

3. A system as in claim 2, wherein:
   said means for selectively slidably removing comprising a plurality of casters attached to said first filtrate assembly; and
   said plurality of casters rolling on said container bottom so that said first filter assembly is selectively removable through said gate side wall when said gate side wall is in said open position.

4. A system as in claim 1, further comprising a means for stabilizing said first filter assembly when said first filter assembly is removed from said container.

5. A system as in claim 4, wherein said means for stabilizing comprising:
   a plurality of wheeled legs;
   a means for removably attaching said plurality of wheeled legs to said first filter assembly as said first filter assembly is removed from said container;
   thereby providing stabilization and support to said first filter assembly.

6. A system as in claim 5, wherein each of said plurality of wheeled legs is extendible.

7. A system as in claim 1, further comprising:
   a second filter assembly defining a second filtrate cavity;
   said container including a bottom; and
   said second filter assembly extending from said first filter assembly in a direction distal to said container bottom.

8. A system as in claim 7, further comprising a means for selectively removably attaching said second filter assembly to and from said first filter assembly.

9. A system as in claim 8, wherein said means for selectively removably attaching comprising:
   said first filter assembly including a plurality of guiding members; and
   said plurality of guiding members forming a channel into which said second filter assembly is inserted.

10. A system as in claim 9, further comprising a means for fastening said second filter assembly in place within said container.

11. A system as in claim 10, wherein said means for fastening comprising:
    at least one connecting member having a first end and a second end;
    said connecting member first end attached to one of said container; and
    said connecting member second end removably attached to said second filter assembly.

12. A system as in claim 7, wherein:
    said first filtrate cavity in fluid communication with said second filtrate cavity; and
    said first means for evacuating filtrate evacuating filtrate from said first filtrate cavity and from said second filtrate cavity.

13. A system as in claim 7, further comprising a second means for evacuating filtrate from said second filtrate cavity.

14. A system as in claim 13, wherein said second means for evacuating filtrate comprising:
    said second filter assembly including a hollow finger;
    said hollow finger in fluid communication with said second filtrate cavity;
    said container including a receiver located on one of said plurality of container side walls;
    said receiver in fluid communication with the exterior of said container; and
    said hollow finger and said receiver sized and constructed so that said hollow finger is insertable into and in fluid communication with said receiver.

15. A system as in claim 14, wherein:
    said receiver including an inner surface;
    said hollow finger including an outer surface;
    said finger outer surface including at least one groove around its perimeter;
    said hollow finger having a seal disposed within each of said at least one groove;
    so that, when said hollow finger is inserted into said receiver, each of said seals sealably engages said receiver inner surface.

16. A system as in claim 1, further comprising a means for securing said first filter assembly so as to prevent horizontal and vertical movement of said first filter assembly within said container.

17. A system as in claim 16, wherein said means for securing comprising:
    said first filter assembly including a lip;
    said container including a shoulder;
    said lip located directly underneath said shoulder when said first filter assembly is positioned in said container so as to prevent vertical movement of said first filter assembly within said container; and
    at least one locking tab fixedly attached to said first filter assembly and removably attached to said shoulder so that horizontal movement of said first filter assembly within said container is prevented when said at least one locking tab is attached to said shoulder.

18. A system as in claim 16, wherein said means for securing comprising:

said container including at least one detainer and a hook;

said first filter assembly including a corresponding detainer rod for each of said at least one detainer and a hook rod;

each of said at least one detainer receiving said corresponding detainer rod and said hook receiving said hook rod when said first filter assembly is positioned in said container so that vertical movement of said first filter assembly within said container is prevented upon said reception; and at least one locking tab fixedly attached to said first filter assembly and removably attached to said container so that horizontal movement of said first filter assembly within said container is prevented when said at least one locking tab is attached to said container.

19. A system as in claim 1, wherein:

said first filter assembly including a lip;

said container including a shoulder;

said shoulder including a gasket;

said gasket hanging over said lip when said first filter assembly is positioned within said container wherein said gasket seals with said lip when said container contains said sludge therein;

said first filter assembly also including a front sealing member; and said front sealing member creating a seal against said container.

20. A system as in claim 1, wherein:

said first filter assembly including a lip and an extension;

said extension fastened to said lip and extending therefrom;

said extension extending to contact said container wherein said extension creates a seal against said container;

said first filter assembly also including a front sealing member; and said front sealing member creating a seal against said container.

21. A system as in claim 20, wherein:

said extension including a plurality of extension sections; and each of said extension sections adjustably attached to said lip.

22. A system as in claim 20, wherein:

said system including a lifting bar fixedly attached to said lip; and said extension resting on said lifting bar so that said lifting bar props said extension upwards towards said container.

23. A system as in claim 1, wherein:

said first filter assembly including a first frame, a first filter media, and a first filter panel;

said first filter media and said first filter panel hingedly attached to said first frame;

thereby enabling said first filtrate cavity to be exposed when said first filter media and said first filter panel are hinged in an open position.

24. A system as in claim 23, further comprising a first means for selectively securing said first filter media and said first filter panel to said first frame so as to prohibit hinged motion relative thereto when said first filter media and said first filter panel are secured to said first frame.

25. A system as in claim 1, further comprising:

a second filter assembly defining a second filtrate cavity;

said second filter assembly including a second filter support box, at least one second filter media, and at least one second filter panel;

said second filter media and said second filter panel hingedly attached to said second filter support box;

thereby enabling said second filtrate cavity to be exposed when said second filter media and said second filter panel are hinged in an open position.

26. A system as in claim 25, further comprising a second means for selectively securing said second filter media and said second filter panel to said second filter support box so as to prohibit hinged motion relative thereto when said second filter media and said second filter panel are secured to said second filter support box.

27. A sludge filtration system, comprising:

a container constructed to receive and maintain sludge therein;

a first filter assembly positioned in said container;

said first filter assembly defining a first filtrate cavity;

first means for evacuating filtrate from said first filtrate cavity;

said first filter assembly selectively removable from said container; and means for stabilizing said first filter assembly when said first filter assembly is removed from said container.

28. A system as in claim 27, wherein said means for stabilizing comprising:

a plurality of wheeled legs;

a means for removably attaching said plurality of wheeled legs to said first filter assembly as said first filter assembly is removed from said container;

thereby providing stabilization and support to said first filter assembly.

29. A system as in claim 28, wherein each of said plurality of wheeled legs is extendible.

* * * * *